United States Patent
Soane et al.

(10) Patent No.: US 7,626,048 B2
(45) Date of Patent: Dec. 1, 2009

(54) METHODS AND APPARATUS FOR REMOVAL OF DEGRADATION BYPRODUCTS AND CONTAMINANTS FROM OIL FOR USE IN PREPARATION OF BIODIESEL

(75) Inventors: David Soane, Chestnut Hill, MA (US); Michael C. Berg, Somerville, MA (US); William M. Mowers, Lynn, MA (US)

(73) Assignee: Soane Energy, LLC, Cambridge, MA (US)

( * ) Notice: Subject to any disclaimer, the term of this patent is extended or adjusted under 35 U.S.C. 154(b) by 167 days.

(21) Appl. No.: 11/498,315

(22) Filed: Aug. 2, 2006

(65) Prior Publication Data
US 2007/0210003 A1 Sep. 13, 2007

Related U.S. Application Data

(60) Provisional application No. 60/704,697, filed on Aug. 2, 2005.

(51) Int. Cl.
*C11B 3/10* (2006.01)
(52) U.S. Cl. .................................. 554/191; 554/193
(58) Field of Classification Search ................ 208/180, 208/289, 298; 210/772, 729; 544/191, 193, 544/198
See application file for complete search history.

(56) References Cited

U.S. PATENT DOCUMENTS

| | | | | | |
|---|---|---|---|---|---|
| 2,609,931 | A | * | 9/1952 | Rodman et al. | 208/180 |
| 3,933,717 | A | * | 1/1976 | Shinohara et al. | 524/567 |
| 4,522,729 | A | * | 6/1985 | Tabler | 210/727 |
| 5,252,762 | A | * | 10/1993 | Denton | 554/196 |
| 5,478,463 | A | * | 12/1995 | Brownawell et al. | 208/180 |

FOREIGN PATENT DOCUMENTS

| | | |
|---|---|---|
| JP | 09313830 | * 12/1997 |
| JP | 2003 041288 | 2/2003 |
| WO | WO 03/088931 A2 | 10/2003 |

OTHER PUBLICATIONS

Namita Yasuo, Oil Treating Filter Media and Oil Treating, 1997, (abstract).*
Database FSTA [online], Ma Yong, et al., "Study on Settling of Natural Vinegar by Chitosan Supported by . . . ," XP002408263, Database accession No. 2004-00-t1090 abstract (2004).

* cited by examiner

*Primary Examiner*—Porfirio Nazario-Gonzalez
*Assistant Examiner*—Yate' K Cutliff
(74) *Attorney, Agent, or Firm*—Elmore Patent Law Group, P.C.; Carolyn S. Elmore; Mahreen Chaudhry Hoda

(57) ABSTRACT

Methods, particles, and devices are disclosed for filtration of oil for use of the oil in the preparation of biodiesel. Disclosed particles may comprise a substantially inert porous particle with a coating comprising a polymer having amine, amino, and/or imine group(s).

26 Claims, No Drawings

METHODS AND APPARATUS FOR REMOVAL OF DEGRADATION BYPRODUCTS AND CONTAMINANTS FROM OIL FOR USE IN PREPARATION OF BIODIESEL

RELATED APPLICATIONS

This application claims benefit of U.S. Provisional Patent Application No. 60/704,697, filed on Aug. 2, 2005, which is hereby incorporated by reference in its entirety.

FIELD OF INVENTION

This invention relates generally to methods, particles and devices for filtration of oil for use of the oil in the preparation of biodiesel. Disclosed particles may comprise a substantially inert porous particle with a coating comprising a polymer having amine, amino, and/or imine group(s).

BACKGROUND

Oils and fats are complex mixtures of water insoluble organic compounds derived from animal or vegetable sources. Such mixtures find utility in a variety of applications around the world. Oils can have a range of properties due to their unique compositions, which vary according to the sources from which they are derived. Oils are particularly well-suited to applications such as lubrication, heat transfer, and food preparation. For the food industry, oils are chosen based on their potential health benefits to the end user, their taste, and their physical properties.

The commercial utility of oils and fats is immense. Millions of tons of oils and fats are used per annum in edible products, including butter, margarine, lard, shortening, mayonnaise, salad oil, and cooking oil. The major components found in cooking or edible oils are primarily triglycerides, which are esters of glycerol linked with three molecules of fatty acids. The fatty acids contain a carboxyl group and a hydrocarbon chain. Individual fatty acids are distinguished from one another by the nature of the hydrocarbon chain, which can vary in length from about 4 to about 24 carbon atoms and can be saturated, monounsaturated (one double bond), or polyunsaturated (two or more double bonds). The most common fatty acids in edible oils and fats are those containing 18 carbons and those having one or more unsaturation (one or more double bond).

These oils can be applied in a working environment where high temperatures are maintained over prolonged periods of time with contact to air. The exposure to high temperatures in the presence of either oxygen or water can lead to degradation of the compounds in the oil via processes such as oxidation and lipolysis. These reactions lead to contaminants that result in an oil that becomes visibly darker in color, has an increase in malodorous components, and a less palatable flavor. This process of degradation of the oil results in rancidity. As the oil becomes rancid, the oil also begins to produce heavy smoke at normal cooking temperature and becomes unusable.

Lipolysis is the decomposition of the ester linkage in the fatty acid. This process is caused by water introduced to the system from frozen foods, for example, or even from fresh foods. The water reacts at the elevated temperatures with the fatty acids, breaking apart the ester linkage to form an acid and an alcohol.

Oxidation is due to the exposure of the oil to the oxygen present in air. Oxygen reacts adversely with the double bonds in the fatty acids. Oxygen is about five times more soluble in oil than in water. Oxygen will react with cooking oil to form many byproducts. These products include peroxides, aldehydes, ketones, epoxides and acids, to name a few.

Oil may also pick up particulates and products from the foodstuffs that are placed in the oil for cooking. These contaminants also lead to the degradation and discoloration of the cooking oil.

The combination of reaction byproducts and contamination from cooking leads to another problem in deep frying, which is the buildup of soap-like compounds. These soapy materials eventually lead to undesirable foaming oil. This property is often used as an indicator of the rancidity of the oil.

Another problem that is associated with these compounds is a build up of trace metals in the oil, which give rise to unpalatable flavors. Trace metals act as a catalyst for the reaction of oxygen and the oil compounds. Thus, the presence of these compounds will cause the oil to turn rancid at a much faster pace. Without treatment, these decomposition processes occur rapidly and ultimately will require the replacement of the cooking oil as often as every 2 or 3 days, thereby significantly raising the cost of operation of a commercial fryer.

Biodiesel is a fuel comprised of mono-alkyl esters of long chain fatty acids derived from vegetable oils or animal fats. Biodiesel is typically produced by a reaction of a vegetable oil or animal fat with an alcohol such as methanol or ethanol in the presence of a catalyst to yield mono-alkyl esters, which can be used as fuel, and glycerin, which is removed. Used edible oils such as vegetable oils have been considered as a source for the production of biodiesel. However, the production of biodiesel from used oil sources is limited by the presence of fatty acids. For example, fatty acids can poison the catalyst used to produce biodiesel from used oil.

There are several methods used in the trade to mitigate these problems, but many of these address only one of the above mentioned causes, thus failing to significantly extend the life of the oil. Some methods introduce additional health and/or safety concerns. Further, these methods do not significantly extend the utility of the oil.

There is a need for new methods for the treatment of cooking oil to extend its service lifetime. Further, such treatment methods are needed to facilitate use of vegetable oil as an important source of biodiesel.

SUMMARY

Particles coated with a filtering media comprising a polymer having amine, amino, and/or imine group(s) are described herein for removal of degradation byproducts and contaminants from oil for use of the oil in preparation of biodiesel.

The particles are able to adsorb, absorb, or otherwise coordinate multiple types of contaminants and/or degradation byproducts of oil, not just one type. For example, the particles are able to coordinate with two, three, or all of the following: polymerized oils, free fatty acids, metal contaminants, and/or polar contaminants.

Without being limited to any theory, the particles of this invention may coordinate with, and thus remove, acid pendant groups and/or oxidative products resulting from polymerization of the oil. Free fatty acids may coordinate with an amine, such as a positively-charged amine on the surface of the particles, facilitating the removal of such contaminants. Metal contaminants may coordinate with amine groups on the disclosed particles. Other polar contaminants may also be attracted to and coordinate with the positively-charged amine on the surface of the filter media. Thus, the disclosed particles may be capable of removing more than one type of contaminant found in oil. Such filtration may be used prior to or as part of a process for conversion of oil to biodiesel.

Furthermore, use of a polymer with a positively charged amine (e.g. primary amine group), wherein the charge is created by contact of the polymer with a strong acid, for example, hydrochloric acid, appears to be more effective than polymers with positively-charged amine groups created using a weak acid, such as acetic acid.

Moreover, upon contact with the oil, the polymer can form a fatty-acid electrostatic complex, upon which the charge on the amine group can be removed to remove the fatty acid from the polymer, wherein the polymer is then capable of being reused. This can be done, for example, by changing the pH of the complex and/or exposing the complex to a salt solution.

In one aspect, the invention relates to a particle suitable for filtration of contaminated edible oils for use in preparation of biodiesel, the particle including a substantially inert porous inner particle and at least a partial coating on the inner particle, wherein the coating includes a non-food grade acceptable polymer having an amine group, an imine group, or both. In certain embodiments, the polymer has a primary amine group, a secondary amine group, or both. In certain embodiments, the polymer has a primary amine group, a secondary amine group, and/or a tertiary amine group. For example, in one embodiment, the polymer is branched polyethyleneimine (BPEI), which may have, for example, primary amine groups, secondary amine groups, and tertiary amine groups in an approximately 1:2:1 ratio (primary:secondary:tertiary). Preferably, the polymer has positively charged amine groups and/or positively charged imine groups. The polymer may be an amine salt, for example.

Where the polymer includes a primary amine group, the primary amine group may have a positive charge created by contact of the polymer with an acid. Preferably, the acid is a strong acid such as hydrochloric acid. The polymer may be a hydrochloric acid salt.

In certain embodiments, the polymer is cross-linked, for example, such that the polymer-coated particle remains porous. It is preferred that the particle is porous. The coating thickness may have a thickness of about 1 micron or less, for example.

The particle is preferably at least partially coated with the polymer. In certain embodiments, the particle is substantially coated with the polymer. The particle may have an average diameter of from about 1 to about 10 microns, for example. The particle may be larger or smaller than this. In certain embodiments, the particle includes one or more of the following: diatomaceous earth, kaolin, silica, and siliceous clay. The particle may comprise or be made of inorganic material. The particle may comprise a metal oxide or semi-metal oxide, i.e., an oxide of Si, Sn, Al, Ti, Bi, Fe, Zr, and/or Zn.

In certain embodiments, the non-food grade acceptable polymer includes at least one of the following: allylamine, polyvinylamine, and branched poly(ethylene)imine.

In certain embodiments, the particle further includes a silane coupling moiety. For example, the coating may include branched poly(ethylene)imine linked to the inner particle via the silane coupling moiety.

In certain embodiments, the invention relates to a filtration device including the particle.

In another aspect, the invention relates to a method for removing contaminants from used edible oil, the method including the step of contacting the oil with a filtering media, wherein the filtering media comprises a non-food grade acceptable polymer including an amine group, an imine group, or both, thereby removing at least some of the contaminants and making the oil suitable for use in preparation of biodiesel. The description of embodiments above can be applied to this aspect of the invention as well.

For example, the polymer may include a primary amine group and/or a secondary amine group. Preferably, the polymer includes a positively charged amine group, a positively charged imine group, or both. The polymer may include an amine salt.

Preferably, the filtering media includes a plurality of particles. The particles may be at least partially coated with the polymer, or they may be substantially coated with the polymer. the particles may have an average diameter, for example, of from about 1 to about 10 microns.

The method may further include the step of contacting the polymer with an acid, thereby creating the positive charge. The acid may include a strong acid, such as hydrochloric acid. The polymer may be in the form of a hydrochloric acid salt.

In certain embodiments, the polymer is cross-linked, for example, so that the particle remains porous. In one embodiment, the inner porous particles include diatomaceous earth and/or the coating includes branched poly(ethylene)imine and/or the coating is covalently bonded to the particle via a coupling moiety, for example, a silane moiety.

In certain embodiments, the oil contains one, two, three, or all of the following types of contaminants and/or byproducts: polymerized oils, fatty acids, metals, and polar contaminants. In an embodiment in which the oil contains fatty acids, the polymer may form a fatty-acid electrostatic complex. Here, the method may further include the step of removing the charge on the amine group to remove the fatty acid from the polymer, wherein the polymer is then capable of again removing contaminants. The removal of the charge on the amine group may be performed, for example, by changing the pH of the complex and/or by exposing the complex to a salt solution.

In yet another aspect, the invention relates to a particle including an inner porous core of diatomaceous earth and at least a partial coating covalently bound via a silane moiety to the porous core. The description of embodiments above can be applied to this aspect of the invention as well.

In any of the aspects described above, further embodiments include use of inorganic and/or organic particles. An example of organic particles includes porous styrene beads. Also, in any of the aspects described above, further embodiments include use of a filtering media that does not require a inner particle core. For example, in certain embodiments, polymer-coated particles are not necessary; it is possible to use one or more of the above-described polymers (e.g. polymers comprising an amine group, an imine group, or both) without having been coated onto an inner particle core. For example, the filtration media may include, consist essentially of, or be made entirely of chitosan and/or PEI (LPEI and/or BPEI) that is internally cross-linked, and which may or may not be in particulate form. The filtration media may be fibrous, and does not have to be in particulate form; for example, micro- and/or nano-sized polymer fibers may be created via "electrospinning" technology, where the polymers include those described herein comprising an amine group, an imine group, or both. Mixtures of particles (coated and/or un-coated) and fibers may be used; for example, fibrous pads loaded with particles may be used.

These embodiments of the present invention, other embodiments, and their features and characteristics, will be apparent from the description, drawings and claims that follow.

DETAILED DESCRIPTION

This disclosure is generally directed to particles and/or polymers that include amine or imine moieties, and methods and devices using the same. Such particles may be used for filtering or removing contaminants in oxidizable compounds and compositions such as those in edible or cooking oils, such as vegetable oil and oils from rendered fat, such as lard or tallow. Such contaminants may include decomposition by-products or oxidative products formed, for example, upon heating or cooking with such oil. The types of contaminants removed include free fatty acids, trace metals, and polar materials.

It is contemplated that methods, compositions, particles, devices and processes of the claimed invention encompass variations and adaptations developed using information from the embodiments described herein.

Throughout the description, where products, systems, formulations, compositions, mixtures, and blends are described as having, including, or comprising specific components, or where processes and methods are described as having, including, or comprising specific steps, it is contemplated that, additionally, there are products, systems, formulations, compositions, mixtures, and blends of the present invention that consist essentially of, or consist of, the recited components, and that there are processes and methods of the present invention that consist essentially of, or consist of, the recited processing steps.

The mention herein of any publication, for example, in the Background section, is not an admission that the publication serves as prior art with respect to any of the claims presented herein. The Background section is presented for purposes of clarity and is not meant as a description of prior art with respect to any claim.

Contemplated herein are particles and compositions for use in filtering or removing contaminants in oils, such as edible oils. In some embodiments, such a particle includes an inert porous inner particle and a least a partial coating or layer disposed on the surface of the inner particle. Such a coating may comprise an amine group or a polymer that includes at least one of an amine or an imine group.

Particles may include an inert porous inner particle that may comprise, for example, diatomaceous earth, clays such as kaolin, silica, silicates, alumina, siliceous clay, montmorillonite, and/or metal oxides. However, any porous material that is relatively inert and can be formed as an inner particle may be used. Such particles may be at least partially coated or layered with a polymer comprising an amino and/or an imine group. Such a coat or layer may not significantly affect the porosity of the inner particle. In an embodiment, a partial or full coating or layer of the disclosed particles may be substantially thin, which may create a high-surface area filter/binding medium. For example, a coating may have a thickness of about 2 microns or less, or about 1 micron or less. Preferably, an inner porous particle is coated with a disclosed polymer such that the coating does not substantially interfere with the porosity of the inner particle, e.g. does not block pores or channels of the inner particle.

Particles and/or an inner particle disclosed herein may be prepared using any standard particulation process, for example spray-drying, emulsion or suspension polymerization, and/or precipitation. Coatings on inner particles that include polymers comprising an amine and/or an imine group may be applied to inner particles by, for example, spray-coating or precipitating the polymer onto the inner particle, forming at least a partial coat.

In some embodiments, a polymer for use on particles disclosed herein may be cross-linked, for example, via additional polymers that may include complementary functionality, or via multifunctional cross-linkers. Such a cross-linked polymer may provide for a partially or substantially porous coating on the particles disclosed herein. Such cross-linking may for example decrease the solubility of a polymer, and/or decrease or eliminate dissolution of a disclosed particle in oil.

Since the size of particles correlates inversely with surface area, smaller particles are in general preferred, for example, particles with approximate average diameter from about 1 micron to about 10 microns, or particles less than about 15 microns or less than about 10 microns. In some embodiments, particles can be prepared with substantially high porosity that may increase the available surface area by forming pores during particulate formation.

The terms "amine" and "amino" are art-recognized and refer to both unsubstituted and substituted amines, e.g., a moiety that may be represented by the general formulas:

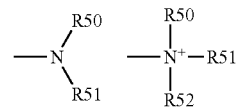

wherein R50, R51 and R52 each independently represent a hydrogen, an alkyl, an alkenyl, —(CH2)m-R61, or R50 and R51, taken together with the N atom to which they are attached complete a heterocycle having from 4 to 8 atoms in the ring structure; R61 represents an aryl, a cycloalkyl, a cycloalkenyl, a heterocycle or a polycycle; and m is zero or an integer in the range of 1 to 8. In certain embodiments, only one of R50 or R51 may be a carbonyl, e.g., R50, R51 and the nitrogen together do not form an imide. In other embodiments, R50 and R51 (and optionally R52) each independently represent a hydrogen, an alkyl, an alkenyl, or —(CH2)m-R61.

The term "imine" refers to a moiety that may be represented by

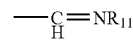

where R11 is H, alkyl or aryl.

Polymers comprising an amine group may include an primary (—NH$_2$R), secondary (—NHR$_2$), and/or tertiary amine (—NR$_3$) group. Such polymers may include a quaternary ammonium cation or may be a quaternary ammonium salt. In some embodiments polymer coatings contemplated herein include primary amines, for example, about 30 or more primary amines, which may optionally further include secondary amines. However, polymers for use in the embodiments disclosed herein may include only secondary or tertiary amine or amino groups, or may include at least one or more of primary, secondary and tertiary amine or amino groups.

In some embodiments, a particle at least partially coated with a disclosed polymer, and methods and devices disclosed herein may be treated or washed with an acidic solution or compound, such as an acidic solution comprising an inorganic acid, to create a charged amine group and/or a stable salt complex. Such polymers may be in the form of an amine salt, and may include salts formed with formic, acetic, succinic, citric, lactic, maleic, fumaric, palmitic, cholic, pamoic, mucic, d-glutamic, d-camphoric, glutaric, glycolic, phthalic, tartaric, lauric, stearic, salicyclic, methanesulfonic, benzenesulfonic, paratoluenesulfonic, sorbic, puric, benzoic, cinnamic and the like organic acids. A particular polymer may be in the form of an amine hydrochloric acid salt. An acidic solution for use may be at a concentration that facilitates the formation of the charged amine group, but may not be at a concentration that would remove the amine group or other moieties from the polymer.

Polymers for use in food grade applications, for example, for filtering or removing contaminants such that an edible oil may be re-used for example, for cooking or frying, may include glycoaminoglycans such as polysaccharides, gums, starch or cationic derivatives thereof, that include an amine group. For example, such food-grade polymers may include chitosan, hyaluronic acid, chrondoitin sulfate, and certain proteins or polypeptides. In certain embodiments, film-forming polymers are used, which facilitates coating of the particles.

Polymers for use in non-food grade application, for example, for filtering or removing contaminants for use in the preparation of biodiesel, may include polyalkyleneamines (PAA) such as tetrabutylenepentamine, polyalkyleneimines (PAI), polyethyleneamine (PEA) such as triethylenetetramine (TETA) and teraethylenepentamine (TEPA), polyethyleneimines (PEI), such as branched polyethyleneimine (BPEI), polyallylamines, and polyvinylamines. Branched polyethylenimine, for example, may have at least moderate branching. In certain embodiments, film-forming polymers are used, which facilitates coating of the particles.

Non-food grade polymers that include an amine group and/or an imine group also include such polymers as poly (amido-amine) dendrimers, poly(alkylamino-glucaramide), and linear polymers with a single primary, secondary or tertiary amine group attached to the polymer units, such as poly(dimethylaminoethyl methacrylates), dimethylamino dextran, and polylysines.

Particles for use in non-food grade applications may also include an porous inner particle at least partially coated or layered with a non-food grade polymer, or covalently bound to a polymer comprising an amine or imine group through a silane moiety, such as that produced by triethyoxy isocyano silane or 3-cyanopropyltrimethoxysilane. Covalently binding a polymer to the surface of the inner particle may be particularly preferable when, for example, the polymer comprising an amine and/or imine group is at least slightly soluble in the edible oil. In a particular non-food embodiment, a BPEI polymer is covalently bound to an inner porous particle via a silane coupling moiety, for example, to avoid detachment and dissolution of BPEI in the edible oil.

This disclosure also provides for methods for removing contaminants from used edible oils. Such a method may comprise contacting an oil with a filtering media that comprises a polymer comprising at least one amine and/or imine group, such as the polymers disclosed herein. The filtering media may be a plurality of particles, wherein the particles include a porous inner core and at least a partial coating of a polymer comprising at least one amine and/or imine group. Such filtering media may also include other particles or media that may also act to remove contaminants, such as activated carbon, amorphous silica, metal silica, clay, citric acid, silica, calcium silicate, magnesium silicate hydrate, calcium silica hydrate, diatomite, and the like.

In some embodiments, a method for removing contaminants from edible oil includes contacting the used or contaminated oil with a particle comprising an inner porous core and at least a partial coating disposed or bonded to the core that comprises a polymer that includes at least one amine or imine group. The coating may be attached or bound to the particle by covalent bonds, non-covalent bonds and/or linked to the particle via Van der Waals forces, hydrogen bonds, and/or other intermolecular forces.

In some embodiments, a method disclosed herein may further comprise filtering the oil to remove the filtering media.

Edible oil may contain several types of contaminants after use, such as after extended heating, that limit the viability of the oil. Significant contaminants are associated with lipolysis and the oxidative decomposition of edible oils. For example, oil may begin to thicken during use which may be due to polymer formation as a consequence of the polymerization of the double bonds present in most edible oils. Another problem may be foaming, which may be a result of released fatty acids coordinated with metals to form surfactant like compounds that stabilize bubble formation and foaming. Such foaming can be hazardous to the operator, due to increased oil spattering. Another significant contaminant are free fatty acids that may be formed via lipolysis or a hydration reaction to form acid and, subsequently, alcohol. Further, polar contaminants may also be a factor in oil decomposition, as well as other contaminant products resulting from oxidation, such as aldehydes and/or peroxides.

Without being limited to any theory, the particles of this invention may coordinate with, and thus remove, acid pendant groups and/or oxidative products resulting from polymerization of the oil. Fatty free acids may coordinate with an amine, such as a positively-charged amine on the surface of the disclosed particles, facilitating the removal of such contaminants. Metal contaminants may coordinate with amine groups on the disclosed particles. Other polar contaminants may also be attracted to and coordinate with the positively-charged amine on the surface of the filter media. Thus, the disclosed particles may be capable of removing more than one type of contaminant found in used edible oil.

In some embodiments, methods disclosed herein may result in at least about 10%, at least about 15%, at least about 20%, at least about 25%, or at least about a 30% reduction in total contaminants. In other embodiments, methods disclosed here may result in at least about 10%, at least about 15%, at least about 20%, at least about 25%, or at least about a 30% reduction in total polar contents.

In a non-food embodiment, a particle for use in removing oil contaminants may be rendered re-useable. For example, a particle comprising a polymer comprising an amine group covalently bound to an inner particle through a silane moiety, may, after usage, be rendered re-usable by changing the pH or by exposing the particles to a salt solution. Such processes may remove, for example, a fatty acid contaminant coordinated with the amine group.

This disclosure also contemplates filtration devices such as gravity feed filters and vacuum filters that comprise particles or filter media disclosed herein. Filter media may be directly added to a vat containing the used cooking oil or flowed through a filter paper packet that contains filter media as part of the packet. Cooking oil may be continuously filtered by using a device that includes particles disclosed herein.

The examples that follow are intended in no way to limit the scope of this invention but are provided to illustrate how to prepare and use the particles and filter media in various embodiments of this invention. Many other embodiments of this invention will be apparent to one skilled in the art. Materials used in the examples below include chitosan: Chitoclear CG400, CG1600 from Primex (Siglufjordur, Iceland); coupling agents: Gelest (Morrisville, Pa.); diatomaceous earth: Grefco Minerals, Inc.(Burney, Calif.); and kaolin: Engelhard Corporation (Islin, N.J.).

Exemplification

Non-Food Grade Media

EXAMPLE 1

BPEI Coated Diatomaceous Earth I

Diatomaceous earth (DE) particles coupled with BPEI are created using a silane coupling agent. 10 g of DE along with 100 mL's of isopropyl alcohol (IPA) and a magnetic stir bar is placed into an Erlenmeyer flask. To this solution is added 0.5 mL 3-cyanopropyltrimethoxysilane and allowed to react for 2 hours. After 2 hours, 1 mL BPEI is added and stirred for an additional 5 hours before filtering and washing the particles with IPA 2x's and deionized water (DI water). The resulting particles contain a coating of BPEI which can be tested for the presence of amines by placing the final particle (0.5 g) into a scintillation vial along with 10 mL of water and a spatula tip of a cellulosic reactive dye with a fluorotriazine reactive dye that forms a covalent bond to amines bound to the surface. These particles are then filtered and washed with DI water 2x's and brine to remove complexed dye followed by water and dried. The resulting particles yield a colored coating bound to the surface. Once the particles are tested positive for surface amines, the particles are then filtered and washed with a 0.05 M HCl solution in isopropanol (IPA) then dried.

EXAMPLE 2

BPEI Coated Diatomaceous Earth II

Diatomaceous earth (DE) particles coupled with BPEI is created using a silane coupling agent. 10 g of DE along with 100 mL isopropyl alcohol (IPA) and a magnetic stir bar is placed into an Erlenmeyer flask. 0.5 mL 3-cyanopropyltrimethoxysilane is added to this solution and allowed to react for 2 hours. After 2 hours, 1 mL of BPEI is added and stirred for an additional 5 hours before filtering and washing the particles with IPA 2x's and deionized water (DI water). The resulting particles contain a coating of BPEI which can be tested for the presence of amines by placing the final particle (0.5 g) into a scintillation vial along with 10 mL's of water and a spatula tip of a cellulosic reactive dye with a fluorotriazine reactive dye that forms a covalent bond to amines bound to the surface. These particles are then filtered and washed with DI water 2x's and brine to remove complexed dye followed by water and dried. The resulting particles yield a colored bound to the surface. Once the particles are tested positive for surface amines, the particles are then filtered and washed with a 0.05 M HCl solution in isopropanol (IPA) then dried.

EXAMPLE 3

Chitosan Bund Onto Diatomaceous Earth

Diatomaceous earth particles covalently bound with chitosan are created by dissolving 2 g of chitosan (flakes) in 500 mL of deionized water and 5 mL of 0.1 M hydrochloric acid. The undissolved chitosan is filtered. Approximately 20 g of diatomaceous earth is added to 400 mL of deionized water, 4 mL of a triethoxy isocyano silane, and 2 mL of ammonium hydroxide and stirred for 2 hours. The slurry is then filtered and washed with deionized water. These functionalized diatomaceous earth particles are then added to the chitosan solution and stirred for 8 hours. The particles are filtered and washed, and finally dried in a vacuum oven.

EXAMPLE 4

Amine Modified Diatomaceous Earth

Particles of diatomaceous earth are functionalized with amine groups by reacting 5 g of diatomaceous earth and 1.5 mL trimethoxy aminopropyl silane in 100 mL deionized water. The reaction is left overnight, and particles are filtered and washed 3x with deionized water and 1x with isopropanol.

EXAMPLE 5

Amine-Modified Kaolin

Particles of Kaolin are functionalized with amine groups by reacting 5 g of Kaolin and 1.0 mL trimethoxy aminopropyl silane in 100 mL deionized water. The reaction is left overnight, and particles are filtered and washed 3x with deionized water and 1x with isopropanol.

EXAMPLE 6

Polyethylenimine Modified Kaolin

Particles of Kaolin are functionalized with branched polyethylenimine by reacting 5 g of Kaolin and 1.0 mL triethoxy isocyano silane in 100 mL deionized water and 0.75 mL of ammonium hydroxide. The reaction is left overnight, and 0.5 g polyethylenimine is then added to the slurry. The particles are filtered and washed 3x with deionized water and 1x with isopropanol after 3 hours.

EXAMPLE 7

Filtration of Oil

Canola oil is heated at 150° C. for 10 days open to air. After cooling, 10 mL of the heat-treated oil is added to 0.1 g of particles and stirred for 12 hours. The oil is then filtered using standard filter paper (as are all control samples), and the absorbance is monitored at 600 nm using a UV-VIS spectrometer. Un-cooked (virgin) canola oil is used as a blank, and the percentage of contaminants removed are calculated by comparing the absorbance of oil not treated with particles. A 13% reduction in contaminants is observed for particles composed of polyethylenimine modified diatomaceous earth prepared using Example 1. When filtering is done with unfunctionalized diatomaceous earth particles, no reduction in total polar contents or viscosity is observed.

EXAMPLE 8

Particle Charge Test

To test the particle charge, the particles created in Examples 1-6 are subjected to a solution of Blue food dye No. 2, which is a tetrasulfate and is statically attracted to a charged surface. A control is used to validate the method, which is a known particle used to filter free fatty acids from solution called magnasol. The particles are subjected to a solution of blue dye, which adheres to the surface of the particles. After washing, the particles remain blue. This test is then applied to the particles created in Examples 1-6 which show excellent color retention, and which demonstrate the ability of these particles to pick up charged species. Each of the particles created in Examples 1-6 passed the test.

Food-Grade Media

EXAMPLE 9

Chitosan Particles

Microparticles of chitosan are created by dissolving 2 g of chitosan (flakes) in 500 mL of deionized water and 10 mL of 0.1 M hydrochloric acid (HCl). Sodium hydroxide is then added slowly while the solution is vigorously agitated until the chitosan precipitated. The resulting particles are approximately 1-5 microns in average diameter.

EXAMPLE 10

2% Chitosan Stock Solution

The chitosan stock solution is created by dispersing 20 g of chitosan (flakes) in 1000 mL of deionized water. To this solution is added hydrochloric acid until a final pH of 5 was achieved by slowly and incrementally adding 10 M HCl with continuous monitoring the pH. This solution becomes a stock solution for chitosan deposition. Several stock solutions are created with varying viscosities as purchased from Primex ehf; CG10, CG110, CG400 and CG800 (creates a 10, 110, 400 and 800 Cps solution at 2% with acetic acid respectively).

EXAMPLE 11

1% Chitosan CG160 Stock Solution

The chitosan stock solution is created by dispersing 10 g of chitosan (flakes) in 1000 mL of deionized water. To this solution is added hydrochloric acid until a final pH of 5 is achieved by slowly and incrementally adding 10 M HCl with continuous monitoring the pH. This solution becomes a stock solution for chitosan deposition. Stock solution of CG1600 is created with a viscosity of 1600 Cps as purchased from Primex ehf; using Primex CG1600 (Creates a 1600 Cps solution at 2% with acetic acid).

EXAMPLE 12

1% CG400 Diatomaceous Earth 1% Chitosan Coating 10 g of diatomaceous earth is added to 100 mL's deionized water with a stir bar to create a 10% solution (un optimized). To this slurry is added 5 mL's of the 2% chitosan stock solution of CG400. The slurry is allowed to stir for 1 hour. Once the slurry becomes homogeneous, the polymer is precipitated out of solution by the slow addition of 0.1 N sodium hydroxide until the pH stabilizes above 7 and the chitosan precipitates onto the particles of diatomaceous earth. The resulting particles contain a coating of chitosan which is less than about one micron thick. The slurry is filtered and washed with a 0.05 M HCl solution in isopropanol (IPA) then dried.

EXAMPLE 13

2% CG400 Diatomaceous Earth –2% Chitosan Coating 10 g of diatomaceous earth is added to 100 mL's deionized water with a stir bar to create a 10% solution (un optimized). To this slurry is added 10 mL's of the 2% chitosan stock solution of CG400. The slurry is allowed to stir for 1 hour. Once the slurry becomes homogeneous, the polymer is precipitated out of solution by the slow addition of 0.1 N sodium hydroxide until the pH stabilizes above 7 and the chitosan precipitates onto the particles of diatomaceous earth. The resulting particles contain a coating of chitosan which is less than about one micron thick. The slurry is filtered and washed with a 0.05 M HCl solution in isopropanol (IPA) then dried.

EXAMPLE 14

4% CG400 Diatomaceous Earth—4% Chitosan Coating 10 g of diatomaceous earth is added to 100 mL's deionized water with a stir bar to create a 10% solution (un optimized). To this slurry is added 20 mL's of the 2% chitosan stock solution of CG400. The slurry is allowed to stir for 1 hour. Once the slurry becomes homogeneous, the polymer is precipitated out of solution by the slow addition of 0.1 N sodium hydroxide until the pH stabilizes above 7 and the chitosan precipitates onto the particles of diatomaceous earth. The resulting particles contain a coating of chitosan which is less than about one micron thick. The slurry is filtered and washed with a 0.05 M HCl solution in isopropanol (IPA) then dried.

EXAMPLE 15

1% CG1600 Diatomaceous Earth—1% Chitosan Coating 10 g of diatomaceous earth is added to 100 mL's deionized water with a stir bar to create a 10% solution (un optimized). To this slurry is added 10 mL's of the 1% chitosan stock solution of CG1600. The slurry is allowed to stir for 1 hour. Once the slurry becomes homogeneous the polymer is precipitated out of solution by the slow addition of 0.1 N sodium hydroxide until the pH stabilizes above 7 and the chitosan precipitates onto the particles of diatomaceous earth. The resulting particles contain a coating of chitosan which is less than about one micron thick. The slurry is filtered and washed with a 0.05 M HCl solution in isopropanol (IPA) then dried.

EXAMPLE 16

2% CG1600 Diatomaceous Earth—2% Chitosan Coating 10 g of diatomaceous earth is added to 100 mL's deionized water with a stir bar to create a 10% solution (un optimized). To this slurry is added 20 mL's of the 1% chitosan stock solution of CG1600. The slurry is allowed to stir for 1 hour. Once the slurry becomes homogeneous, the polymer is precipitated out of solution by the slow addition of 0.1 N sodium hydroxide until the pH stabilizes above 7 and the chitosan precipitates onto the particles of diatomaceous earth. The resulting particles contain a coating of chitosan which is less than about one micron thick. The slurry is filtered and washed with a 0.05 M HCl solution in isopropanol (IPA) then dried.

EXAMPLE 17

4% CG1600 Diatomaceous Earth—4% Chitosan Coating 10 g of diatomaceous earth is added to 100 mL's deionized water with a stir bar to create a 10% solution (un optimized). To this slurry is added 40 mL's of the 1% chitosan stock solution of CG1600. The slurry is allowed to stir for 1 hour. Once the slurry becomes homogeneous, the polymer is precipitated out of solution by the slow addition of 0.1 N sodium hydroxide until the pH stabilizes above 7 and the chitosan precipitates onto the particles of diatomaceous earth. The resulting particles contain a coating of chitosan which is less than about one micron thick. The slurry is filtered and washed with a 0.05 M HCl solution in isopropanol (IPA) then dried.

EXAMPLE 18

Filtration

Canola oil is heated at 150° C. for 10 days open to air. After cooling, 10 mL of the heat-treated oil was added to 0.1 g of particles and stirred for 12 hours. The oil is then filtered using standard filter paper (as were all control samples), and the absorbance is monitored at 600 nm using a UV-VIS spectrometer. Un-cooked (virgin) canola oil is used as a blank, and the percentage of contaminants removed is calculated by comparing the absorbance of oil not treated with particles.

A 31% reduction is observed for particles composed of chitosan coated onto diatomaceous earth (Example 13)

EXAMPLE 19 Filtration

Canola oil is heated at 180° C. for 2 days open to air. The total polar contents is measured using an Ebro FOM 310 oil monitor. After cooling, 20 mL of the heat-treated oil is added to 2.0 g of particles and stirred for 12 hours. The oil is then filtered using standard filter paper (as were all control samples), and the samples are then re-heated back up to 180° C. and the total polar contents are read (note: oil needs to be hot to use Ebro oil monitor). The viscosity is also measured using a Brookfield viscometer before and after filtering with particles as are control samples that are not heat-treated.

A 33% reduction in total polar contents is observed for particles that had chitosan bound to them (example 12) after subtracting out the baseline (unheated oil). The viscosity also decreases after filtering with the particles bound with chitosan. Lower viscosity indicates polymerized oils (e.g. hydrogenated polymers) have been removed.

When filtering is done with unfunctionalized diatomaceous earth particles, no reduction in total polar contents or viscosity is observed.

EXAMPLE 20

Charge Test

To test the particle charge, the particles created in Examples 12-17 are subjected to a solution of Blue food dye No. 2, which is a tetrasulfate and is statically attracted to a charged particle surface. A control is used to validate the method, which is a known particle used to filter free fatty acids from solution called magnasol. These particles are subjected to a solution of blue dye, which adheres to the surface of the particles. After washing, the particles remain blue. This test is then applied to the particles created in Examples 12-17, which show excellent color retention, and which demonstrate the ability of the particles to adsorb, absorb, or otherwise pick up charged species. Each of the particles created in Examples 12-17 passed the test.

EQUIVALENTS

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present invention.

The invention claimed is:

1. A method for removing contaminants from oil, wherein the contaminants comprise fatty acids, the method comprising the step of contacting the oil with a filtering media,
   wherein the filtering media comprises a plurality of substantially inert, porous particles, wherein each particle is at least partially coated with a non-food grade acceptable polymer comprising an amine group, an imine group, or both, thereby removing at least some of said contaminants,
   wherein after said contacting, said polymer forms a fatty acid electrostatic complex, and
   wherein after formation of the fatty acid electrostatic complex, the charge on the amine or imine group is removed in order to remove the fatty acid from the polymer thereby rendering the polymer capable of again removing contaminants,
   wherein said method makes said oil suitable for use in preparation of biodiesel.

2. A method for removing contaminants from oil, wherein the contaminants comprise fatty acids, the method comprising the step of contacting the oil with a filtering media, wherein after said contacting, a fatty acid electrostatic complex is formed, wherein the filtering media comprises a plurality of substantially inert, porous particles, wherein each particle is at least partially coated with a non-food grade acceptable polymer comprising an amine group, an imine group, or both, thereby removing at least some of said contaminants, wherein after said contacting, the method comprises at least one of the following:
   (i) changing the pH of said complex; and
   (ii) exposing said complex to a salt solution;
   wherein said method makes the oil suitable for use in preparation of biodiesel.

3. The method of claim 1, wherein said polymer comprises a primary amine group.

4. The method of claim 1, wherein said polymer comprises a secondary amine group.

5. The method of claim 1, wherein said polymer comprises a positively charged amine group, a positively charged imine group, or both.

6. The method of claim 1, wherein said polymer comprises an amine salt.

7. The method of claim 1, wherein said particles have an average diameter of from about 1 to about 10 microns.

8. The method of claim 5, further comprising the step of contacting the polymer with an acid, thereby creating said positive charge.

9. The method of claim 8, wherein said acid comprises hydrochloric acid.

10. The method of claim 1, wherein said polymer is cross-linked.

11. The method of claim 1, wherein said particles comprise diatomaceous earth.

12. The method of claim 11, wherein said polymer is a branched poly(ethylene)imine.

13. The method of claim 12, wherein said polymer is covalently bonded to said particle via a coupling moiety.

14. The method of claim 13, wherein said coupling moiety is a silane moiety.

15. The method of claim 2, wherein said polymer comprises a primary amine group.

16. The method of claim 2, wherein said polymer comprises a secondary amine group.

17. The method of claim 2, wherein said polymer comprises a positively charged amine group, a positively charged imine group, or both.

18. The method of claim 2, wherein said polymer comprises an amine salt.

19. The method of claim 2, wherein said particles have an average diameter of from about 1 to about 10 microns.

20. The method of claim 17, further comprising the step of contacting the polymer with an acid, thereby creating said positive charge.

21. The method of claim 20, wherein said acid comprises hydrochloric acid.

22. The method of claim 2, wherein said polymer is cross-linked.

23. The method of claim 2, wherein said particles comprise diatomaceous earth.

24. The method of claim 23, wherein said polymer is a branched poly(ethylene)imine.

25. The method of claim 24, wherein said polymer is covalently bonded to said particle via a coupling moiety.

26. The method of claim 25, wherein said coupling moiety is a silane moiety.

\* \* \* \* \*

UNITED STATES PATENT AND TRADEMARK OFFICE
CERTIFICATE OF CORRECTION

PATENT NO. : 7,626,048 B2  Page 1 of 1
APPLICATION NO. : 11/498315
DATED : December 1, 2009
INVENTOR(S) : David Soane et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 167 days.

should read (*) Notice: Subject to any disclaimer, the term of this patent is extended or adjusted under 35 U.S.C. 154(b) by 288 days.

Signed and Sealed this

Twenty-fourth Day of August, 2010

David J. Kappos
*Director of the United States Patent and Trademark Office*